April 25, 1967 J. D. HOPKINS 3,315,808
FILTER PRESSURE RELIEF VALVE
Filed March 24, 1965
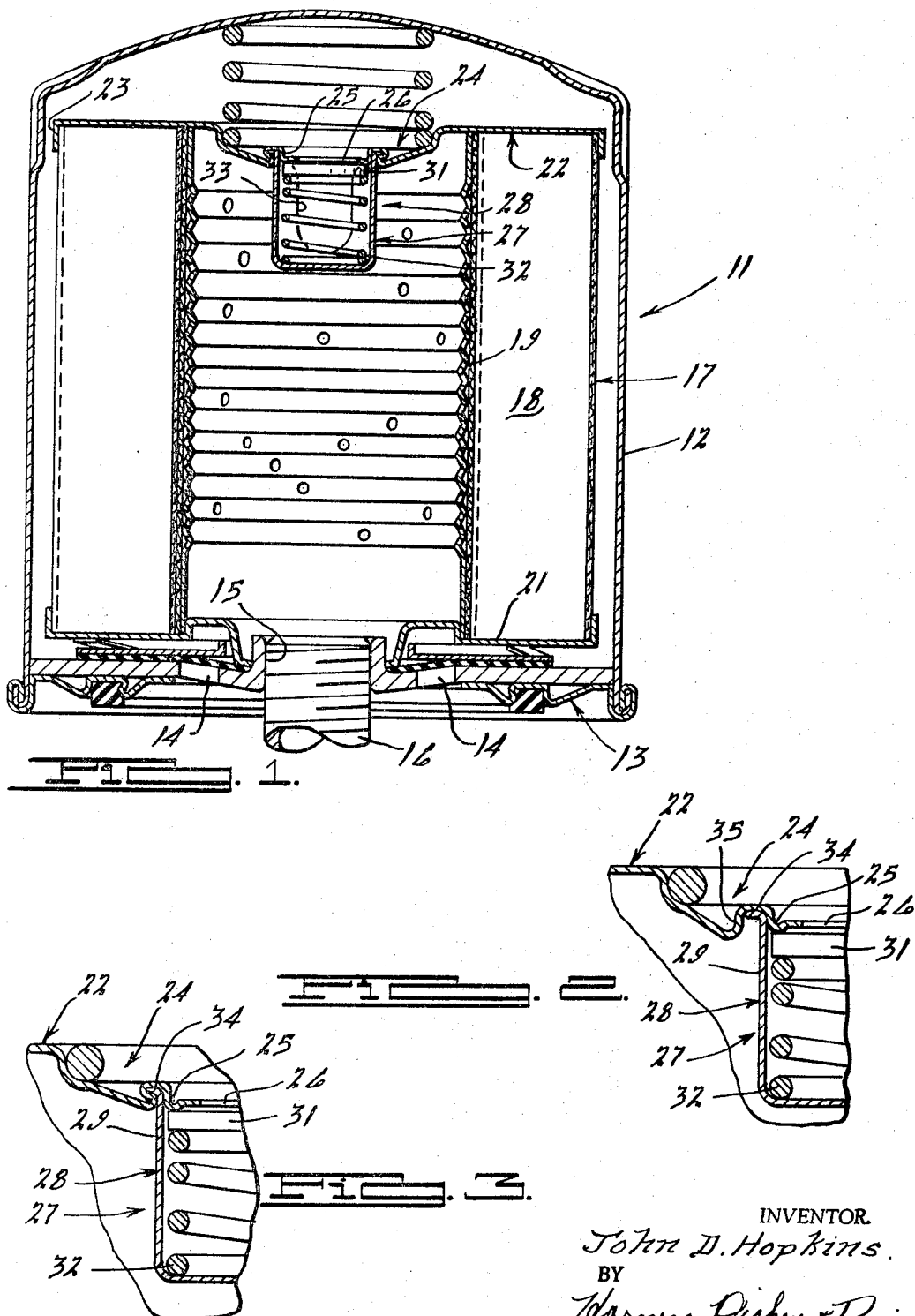
INVENTOR.
John D. Hopkins.
BY
Harness, Dickey & Pierce
ATTORNEYS.

3,315,808
FILTER PRESSURE RELIEF VALVE
John D. Hopkins, Franksville, Wis., assignor to Walker Manufacturing Company, a corporation of Delaware
Filed Mar. 24, 1965, Ser. No. 442,396
2 Claims. (Cl. 210—130)

This invention relates to a filter, and more particularly to an improved pressure relief valve for a filter.

One object of this invention is to provide a relief valve for a filter that is simple in construction and lends itself to convenient assembly.

Another object of this invention is to provide a pressure relief valve for a filter that may be affixed to a filter end cap without requiring welding.

Another object of the present invention is the provision of a pressure relief valve for a filter that embodies a minimum number of pieces.

In accordance with this invention, a filter comprises an end cap having an aperture formed by a depending flange thereof, and a valve member is adapted to abuttingly engage the flange to close the aperture. A valve housing constrains the valve member for movement into and out of engagement with the flange. The end cap and the valve housing have engaging portions for fixing the valve housing relative to the end cap around the periphery of the aperture.

Other objects and advantages of this invention will become more apparent when considered in conjunction with the accompanying drawings, wherein:

FIGURE 1 is a cross-sectional view of an oil filter for an internal combustion engine embodying this invention;

FIGURE 2 is an enlarged cross-sectional view of the end cap and pressure relief valve of the filter shown in FIGURE 1 prior to assembly; and FIGURE 3 is a cross sectional view, in part similar to FIGURE 2, showing the valve housing and end cap in their assembled position.

Referring now in detail to the drawings and in particular to FIGURE 1, an oil filter for an internal combustion engine is indicated generally by the reference numeral 11. The construction of the oil filter 11, in general, forms no part of this invention and, therefore, the filter 11 will be described only generally. The filter 11 is of the throwaway type and comprises a sheet metal outer shell 12 closed by an end plate assembly 13 that provides a plurality of oil inlet apertures 14 and an oil outlet in the form of a tapped hole 15 that is adapted to be threaded onto a fitting 16. An annular filter element 17 is contained within the housing 12. The filter element 17 may include any type of filtering media, for example, pleated paper 18, which surrounds a perforated center tube 19. A lower end cap 21 confines the lower end of the filter media at 18.

A sheet metal upper end cap, indicated generally by the reference numeral 22, confines the upper end of the filter media 18. The end cap 22, which may be formed conveniently from a single piece of sheet metal, has a first depending circular flange 23 that is adapted to engage the outer periphery of the pleats of the filter media 18. A depressed central portion 24 is formed concentrically with the center tube 19. The depressed portion 24 terminates in a depending rolled over flange 25 that defines a central aperture 26 which functions as a by-pass passage, as will become apparent as this description proceeds.

A pressure relief valve assembly, indicated generally by the reference numeral 27, is supported by the end cap 22 and depends into the center tube 19. The relief valve 27 comprises a valve cage 28 having a cylindrical part 29 that guides and confines a valve disc 31 for reciprocation. A coil spring 32 is contained within the valve housing 28 to urge the valve disc 31 into abutment with the depending flange 25 to close the aperture 26. A plurality of longitudinal slots 33 are formed in the cylindrical portion 29 so that oil may bypass the filter media 18 when the valve disc 31 is not in engagement with the valve seat provided by the flange 25.

The cylindrical portion 29 terminates at its upper end in a radially outwardly extending flange 34. The flange 34 forms a means for affixing the valve housing 28 relative to the end cap 22, as may be best understood by reference to FIGURES 2 and 3.

When the end cap 22 is initially formed, a depending flange-like portion 35 surrounds the depending flange 25 around the periphery of the extending flange 34 of the valve cage 28. After the valve cage 28 is positioned with its flange 34 between the flanges 25 and 35 of the end cap 22 and the valve disc 31 and spring 32 are in place (FIGURE 2), the flange 35 is rolled over the flange 34 (FIGURE 3) to form a tight seal around the periphery of the central aperture 26 and to fix the valve cage 28 relative to the end cap 22.

The pressure relief valve 27 operates in the well known manner. When the filter media 18 becomes clogged so that it will not pass sufficient oil for lubrication of the engine, the pressure upon the valve disc 31 overcomes the preload in the coil spring 32 and the valve disc 31 is forced away from its engagement with the depending flange 25. Oil may then flow directly from the oil inlet apertures 14 through the central aperture 26 in the end plate 22 to the oil outlet fitting 16 bypassing the filter media 18.

It should be readily apparent that a pressure relief valve having a minimum number of parts is, therefore, provided. It is additionally unnecessary to spot weld the relief valve parts together so that there will be no danger of the valve disc being fixed relative to the valve cage and thus inoperative.

It is to be understood that various changes and modifications may be made without departing from the spirit and scope of the invention, as set forth in the appended claims.

What is claimed is:

1. In a filter, an end cap, an aperture formed by a first depending flange of said end cap, a valve disc adapted to abuttingly engage said first flange to close said aperture, a second depending flange formed in said end cap around said first flange, a valve cage for guiding said valve disc, said valve cage having a cylindrical portion encircling said valve disc, said cylindrical portion terminating in an outwardly extending flange at one end thereof, said outwardly extending flange extending between said first and said second flanges of said end cap, said second end cap flange being folded over and engaging said valve cage flange, and said end cap flanges constituting the sole support for fixing said valve cage relative to said end cap.

2. A filter cartridge comprising an annular filter media having a center tube, an end cap for said filter cartridge, said end cap having a first portion engaging one end surface of said filter media and a central aperture formed by a depending flange in alignment with said center tube, said depending flange providing a valve seat, a valve disc adapted to abuttingly engage said valve seat, a valve cage for constraining said valve disc, said valve cage comprising a cylindrical portion depending into said inner tube for guiding said valve disc, spring means interposed in said valve cage for urging said valve disc into engagement with said valve seat, said cylindrical portion terminating at one end thereof in an outwardly extending flange engaging said end cap, a second depending flange formed in said end cap around said central aperture and folded over and engaging said valve cage flange for fixing said valve cage relative to said end cap.

References Cited by the Examiner

UNITED STATES PATENTS

| | | | |
|---|---|---|---|
| 1,817,710 | 8/1931 | Rollason | 29—510 |
| 2,031,838 | 2/1936 | Leonhart | 29—509 |
| 2,888,141 | 5/1959 | Coates et al. | 210—136 X |
| 3,110,079 | 11/1963 | Wilson et al. | 29—509 X |
| 3,193,101 | 7/1965 | Humbert | 210—130 |

FOREIGN PATENTS 668,236　8/1963　Canada.

REUBEN FRIEDMAN, *Primary Examiner.*

SAMIH N. ZAHARNA, W. S. BRADBURY,
*Assistant Examiners.*